(12) United States Patent (10) Patent No.: US 8,351,598 B2
Raheja et al. (45) Date of Patent: Jan. 8, 2013

(54) CROSSTALK RECOGNITION IN PRESENCE OF RADIO FREQUENCY INTERFERENCE

(75) Inventors: Kunal Raheja, Noida (IN); Patrick Duvaut, Tinton Falls, NJ (US)

(73) Assignee: Ikanos Communications, Inc., Fremont, CA (US)

( * ) Notice: Subject to any disclaimer, the term of this patent is extended or adjusted under 35 U.S.C. 154(b) by 1293 days.

(21) Appl. No.: 12/109,566

(22) Filed: Apr. 25, 2008

(65) Prior Publication Data

US 2008/0267392 A1 Oct. 30, 2008

Related U.S. Application Data

(60) Provisional application No. 60/926,165, filed on Apr. 25, 2007.

(51) Int. Cl.
*H04M 7/00* (2006.01)
(52) U.S. Cl. ........................ 379/417; 370/201
(58) Field of Classification Search .......... 379/416–417, 379/391, 392, 392.01; 370/201; 455/63.1, 455/67.13, 114.2, 295, 501, 570
See application file for complete search history.

(56) References Cited

U.S. PATENT DOCUMENTS

| | | | |
|---|---|---|---|
| 6,999,583 B2 * | 2/2006 | Valenti et al. | 379/417 |
| 7,809,116 B2 * | 10/2010 | Rhee et al. | 379/1.04 |
| 2004/0095921 A1 * | 5/2004 | Kerpez | 370/351 |
| 2005/0026572 A1 * | 2/2005 | Dasgupta et al. | 455/114.2 |
| 2005/0105473 A1 * | 5/2005 | Hausman et al. | 370/249 |
| 2010/0208785 A1 * | 8/2010 | Lindqvist et al. | 375/227 |

OTHER PUBLICATIONS

S. Galli, C. Valenti, and K. Kerpez, "A Frequency-Domain Approach to Crosstalk Identification in xDSL Systems", IEEE Journal on Selected Areas in Communications, vol. 19, No. 8, pp. 1497-1506, Aug. 2001.
C. Zeng, C. Aldana, A. A. Salvekar, C. Cioffi, "Crosstalk Identification in xDSL Systems", IEEE Journal on Selected Areas in Communications, vol. 19, No. 8, pp. 1488-1496, Aug. 2001.
C. Aldana, A. Salvekar, J. Tellado, and J. Cioffi, "MAP Crosstalk profile for Multicarrier Systems", IEEE International Conference on Telecommunications, 2001.
A .Salvekar, C. Aldana, E. De Carvalho, J. Cioffi,"Crosstalk Profile Detection for use in Multiuser Detection" IEEE International Conference on Communications, 2001. ICC 2001. vol. 7, pp. 2171-2175, Jun. 2001.

* cited by examiner

*Primary Examiner* — Fan Tsang
*Assistant Examiner* — Akelaw Teshale
(74) *Attorney, Agent, or Firm* — Mark J. Danielson; Pillsbury Winthrop Shaw Pittman LLP

(57) ABSTRACT

Crosstalk interference induced by the adjacent pairs is one of the major performance limiting factors of DSL systems. As there is a rapid increase in the deployment of DSL services worldwide, the need to provide information about noise related parameters to the operators and the service providers is of utmost importance. Satisfying such a need enables operators to anticipate the line capacity and understand the noise level characteristics of the loop environment. Specifically, crosstalk and more particularly upstream near end crosstalk (NEXT) in the presence of narrowband interference can be classified to isolate the particular service type causing the upstream NEXT. The identification of the service type of the upstream NEXT would enable operators to address the disturber.

29 Claims, 10 Drawing Sheets

FIG. 1

CROSSTALK RECOGNITION IN PRESENCE OF RADIO FREQUENCY INTERFERENCE

CROSS-REFERENCE TO RELATED APPLICATION

Under 35 U.S.C. 119, this application claims priority to, and the benefit of, U.S. Provisional Patent Application entitled, "Upstream Near-End Crosstalk (NEXT) Recognition at the Central Office (CO) in Presence of RFI," having Ser. No. 60/926,165, filed on Apr. 25, 2007, which is incorporated by reference in its entirety.

BACKGROUND OF THE INVENTION

1. Field of the Invention

The invention relates to digital subscriber line (xDSL) communications and more particularly to identifying crosstalk in an xDSL system.

2. Background Information

Crosstalk in a communications system is the undesired effect or interference in a channel or circuit caused by another circuit or channel. Crosstalk interference by the adjacent pairs is one of the major performance limiting factors of xDSL systems.

FIG. 1 illustrates a typical communications system such as an xDSL system. Central office equipment (CO) 102 communicates to at least one consumer premises equipment (CPE) 104 (and in this example CPE 106 as well). Data transmitted towards the CPE shown by lines 108 and 112 is referred to as downstream. Data transmitted towards the CO shown by lines 110 and 114 is referred to as upstream. For a given line, crosstalk typically occurs when the interfering disturber is in close proximity to the line, which most likely occurs near either the CO or the CPE, because that is where there is a likelihood of aggregating lines.

FIG. 2 illustrates the various types of crosstalk typically experienced in a communications system. For simplicity, two CO's and two CPE's are shown. CO 202 is in communications with CPE 204 and CO 206 is in communications with CPE 208. For the sake of example, the crosstalk from CO 206 and CPE 208 to either CO 202 or CPE 204 is described. The term "far-end" refers to when the interference is away from the receiving side and the term "near-end" refers to when the interference is close to the receiving side. For example, interference shown by arrow 212 illustrates noise generated by CO 206 coupled into the downstream communications and received by CPE 204. The term "victim" is applied to the line or the circuit being examined for crosstalk, and the term "disturber" is applied to the source of the crosstalk. Since the noise is generated away from the receiving side, this is referred to as downstream far-end crosstalk (FEXT). Likewise, interference shown by arrow 214 illustrates upstream near-end crosstalk (NEXT). Interference shown by arrow 216 illustrates upstream FEXT, and interference shown by arrow 218 illustrates downstream NEXT.

In xDSL communications, the communications bands are divided channels known as bins or tones. For example, the asymmetric digital subscriber line (ADSL) bins are 4.3125 kHz wide. Typically, the upstream communications uses fewer bins (for example, 26 bins spanning from 25.875 kHz to 138 kHz) making them more susceptible to interference.

Furthermore, FEXT, in general, is typically less severe than NEXT as it gets attenuated by the loop. In ADSL, the available lower bandwidth for the upstream channel might be severely affected by the low frequency components of NEXT generated by sources such as single line high rate digital subscriber line (SHDSL). Also, the number of NEXT sources or potential disturbers at the CO side is higher due to large density mix of services at the CO. Further, self-NEXT can become the dominant NEXT disturber at long distances because other services do not extend so far. Therefore, upstream NEXT crosstalk is the most crucial interference to address for ADSL systems In the past, the identification of noise and interference required loop qualification and line testing that had to be performed by deploying technicians to both ends of a connection and having them take measurements in a coordinated manner using special test equipment. Recently, xDSL standards such as ADSL2, ADSL2+, or very high speed digital subscriber line 2 (VDSL2) have recognized that xDSL modems are capable of transmitting and processing the necessary test signals, and of controlling the collection and exchange of these measurements from one end of the connection, typically the CO end. Within these standards, the capability is referred to as Dual Ended Line Testing (DELT).

A DELT session can be requested by either the CO or the CPE, and is often requested as part of the discovery phase of the initialization procedure. The difficulty is that the results, such as Quiet Line Noise (QLN) measurements, from the DELT session provide raw measurements, but such measurements in raw form do not provide meaningful information to a service provider. One approach applied in the past is to find a maximum correlation with a "basis or a representative set" of measured crosstalk coupling functions. This basis is supposed to be representative of the crosstalk disturber. However, such an approach does not consider the fact that the basis set is shaped by the effects of the front-end, such as filter effects. Also, in a real world situation, in addition to the crosstalk disturber (which is a wideband disturber), a narrowband disturber may generate radio frequency interference (RFI) which can arise from radio transmissions such as amplitude modulations (AM) radio transmitters and amateur radio transmitters like HAM radios and operate at frequencies that fall into the frequency bands of xDSL. This situation is not accounted for by the correlation approach just described. Accordingly, various needs exist in the industry to address the aforementioned deficiencies and inadequacies.

SUMMARY OF INVENTION

Briefly described, one embodiment, among others, is a method for identifying the service type of a crosstalk disturber. The method comprises the steps of identifying narrowband disturbers using a power spectral density (PSD), suppressing the narrowband disturber to generate a new PSD and applying a classification tree to the new PSD to identify the service type of the crosstalk disturber. Optionally, the method can further comprise the step of calibration to eliminate the background noise from the PSD. The PSD can be measured during a QLN measurement and delivered using a management information base (MIB). Furthermore, the QLN MIB could be supplied by either a DELT session or a single end line testing (SELT) session. The identification employs a classification tree where feature analysis is used to separate the input into various classes. Such feature analysis can comprise the comparison of a feature to a predetermined value where the feature can be curvature, slope or a combination of both. The service types can be derived from DSL (DSL is used to distinguish basic access digital subscriber line from generic digital subscriber line which is denoted as xDSL), T-carrier 1 (T1), high rate digital subscriber line (HDSL), downstream ADSL, SHDSL 2056/4168 Kbps (SHDSL2056/4168) and SHDSL 520 Kbps (SHDSL520).

Briefly described, another embodiment is a crosstalk classification system comprising a processor, memory and instructions, where the instructions cause the processor to identify narrowband disturbers using a PSD, to suppress the narrowband disturbers to generate a new PSD, and to apply a classification tree to the new PSD to identify the service type of the dominant crosstalk disturber. The system can incorporate the same variations as is described for the method above. An xDSL system can comprise this crosstalk classification system. In yet another embodiment, the crosstalk classification system can comprise a means for identifying narrowband disturbers using a PSD, a means for suppressing the narrowband disturbers to generate a new PSD, and a means for applying a classification tree to the new PSD to identify the service type of the crosstalk disturber.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

A detailed description of embodiments of the present invention is presented below. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

While the standards provide the acquisition of various measurements during loop testing. These measurements in raw form are of limited use in addressing crosstalk issues. One useful piece of meaningful information is the service type of any dominant crosstalk disturber. For example, if the service type of the dominant crosstalk disturber is identified, the service provider could dispatch technicians or other personnel to investigate the equipment causing the crosstalk and possibly correct the problem. Furthermore, the classification of service type can aid in the ability to compute the expected capacity of an xDSL system.

The embodiments described below are used to identify the dominant crosstalk disturber in the context of upstream NEXT disturbers, which as discussed tends to have a greater impact on xDSL systems. However, it is understood that such approaches can equally apply to downstream NEXT disturbers, upstream FEXT disturbers and downstream FEXT disturbers. It is apparent to one of ordinary skill in the art the variations needed to take the appropriate QLN measurements in each of these contexts.

One embodiment employs the QLN measurements. The QLN measurements are typically obtained during a DELT session and reported through the use of a MIB. The QLN measurements include the PSD of the upstream QLN. The QLN tests are performed by measuring for each frequency or bin the power on the transmission lines when there is no signal transmitted by the CO or the CPE. When no signal is transmitted, the resultant power seen is due to crosstalk, external noise or background noise. Even when there is no crosstalk or external noise, a real system will experience background noise usually due to the platform or the front end.

While the embodiments given use a DELT session and a DELT module, any process that yields QLN measurements can be used. For example, a SELT session can also produce QLN measurements. While DELT requires a connection between CO and CPE, SELT traditionally is carried out at the CO but can also be carried out at the CPE. Regardless, both methods can be used to take QLN measurements, which in turn can be used to classify the service type of crosstalk disturbers.

Figure 1:
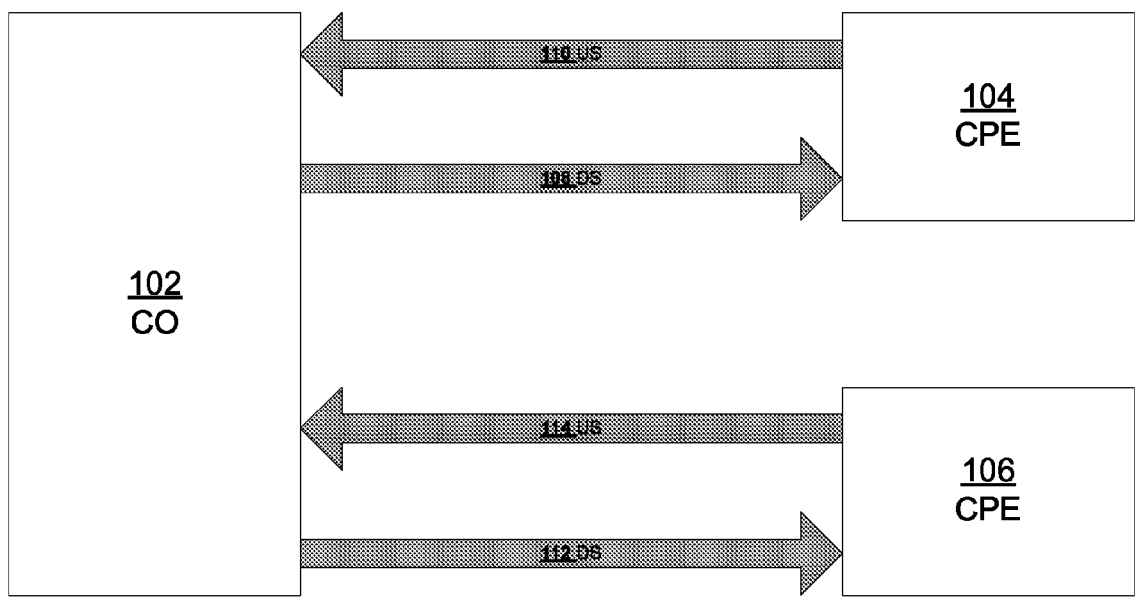
FIG. 1 illustrates a typical communications system such as an xDSL system.
Figures 1, 2:
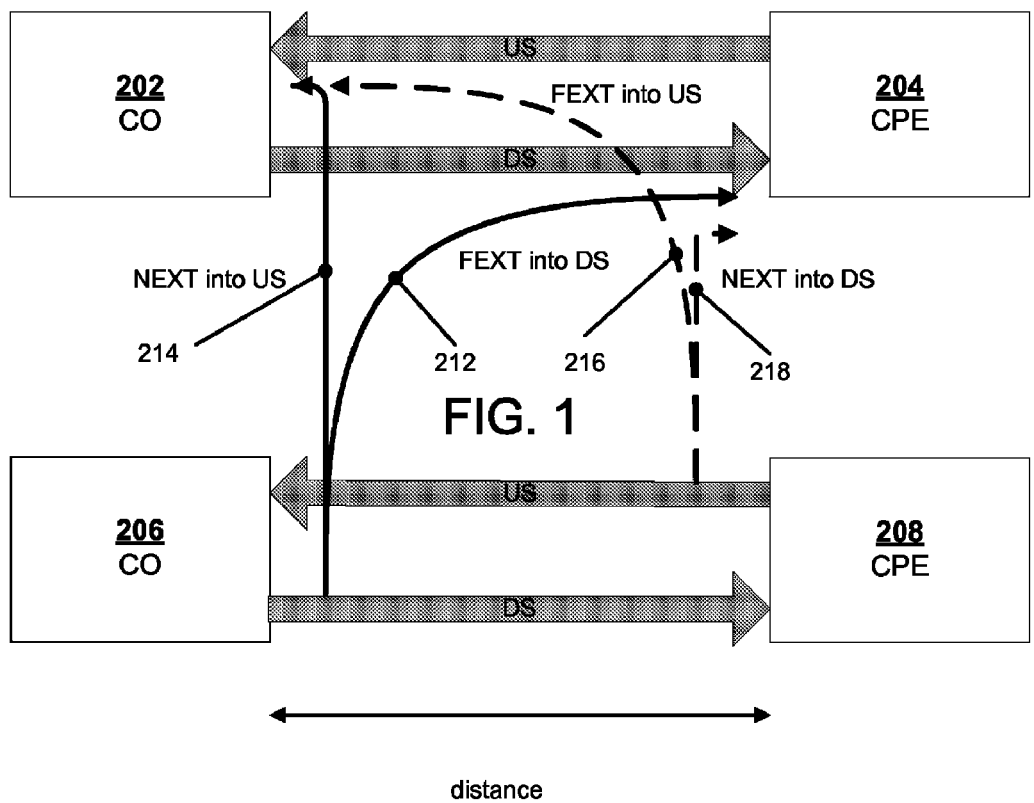
FIG. 2 illustrates the various types of crosstalk typically experienced in a communications system.
Figure 3:
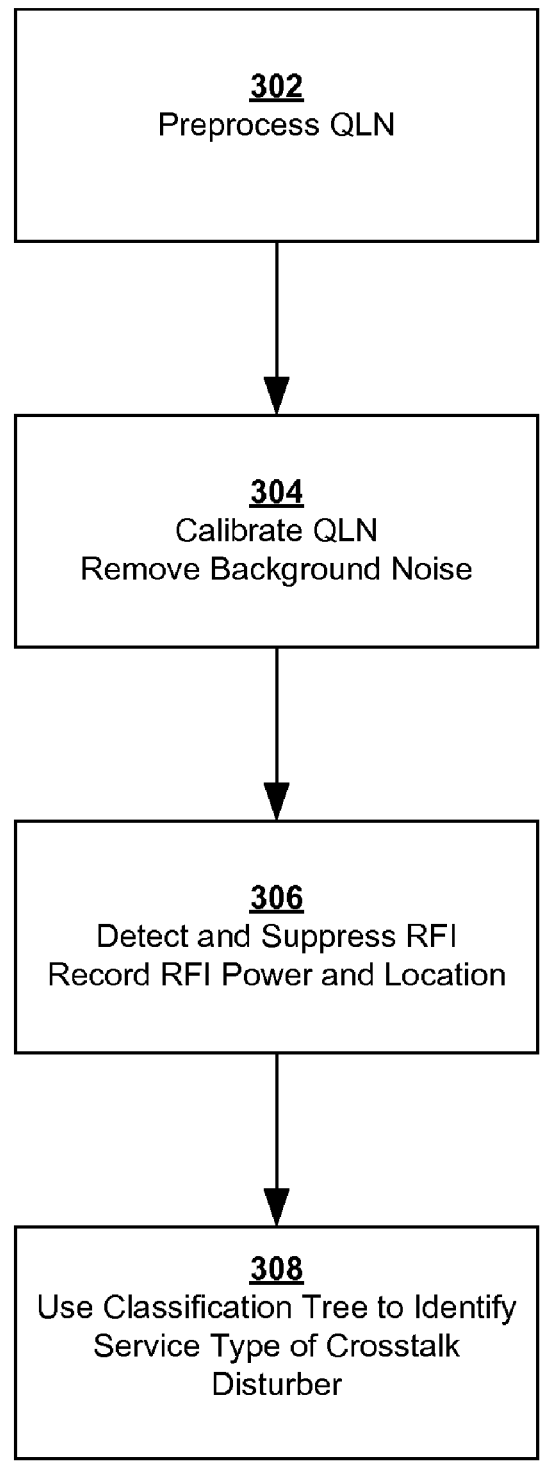
FIG. 3 is a flowchart illustrating a method for identifying interference and crosstalk using QLN measurements.

FIG. 3 is a flowchart illustrating a method for identifying interference and crosstalk using QLN measurements. This method can be implemented in a hardware or software module in a CO. At step 302, preprocessing of data is carried out. Specifically, this is done to reduce the effect of any outliers which might occur in the QLN measurements, for example, due to front-end effects, by applying a suitable smooth periodogram. One method of applying a smooth periodogram is to apply a low pass filter to the QLN measurements in a linear scale. At step 304, optionally, calibration can take place to remove or compensate for the presence of background noise from the measured QLN so that effect of the actual dominant crosstalk disturber can be analyzed. Calibration is performed by taking the QLN measurements over a null loop, that is, a configuration where the CPE is directly connected to a CO, in effect a zero loop length, in presence of no external noise and crosstalk interference on the line. The power measured in a QLN measurement over the null loop can be attributed to the background noise. By subtracting the QLN measurement over the null loop from the QLN measurements of an in-service platform, the background noise can be eliminated allowing direct analysis of any crosstalk disturber than may be on the line. The calibration can take place on a linear scale. For example, it is often common to work with power measurements on a logarithmic scale; however, a linear scale can be used for example to subtract the null loop QLN measurement from the in-service QLN measurements to eliminate the background noise. Once background noise can be accounted for, a PSD of the QLN without background noise can be provided. The implications of the omission of this step are described below for step 308.

At step 306, narrowband disturbers or RFI can be detected and identified. RFI generally occurs at a much higher power level than the crosstalk disturber. RFI is also narrowband and in practice do not span many bins. RFI is detected by searching for spikes in the PSD of the QLN. This can be performed by identifying locations where the PSD crosses a predetermined threshold. Once identified the center frequency of the RFI and the power level can be provided. Typically, the frequency can be expressed in kHz and the power in dBm. Also, with the identification of RFI, the effect of the RFI can be suppressed. For example, an adaptive median filter of a suitable order can be applied to the PSD. As an example, the suppression can be carried out on a linear scale and in particular the adaptive median filter can be applied on PSD data on a linear scale. The filter selectively suppresses the RFI depending on the relative power level compared to adjacent bins and also depending on the relative width compared to the window size used in the filter.

Generally, the result of steps 302, 304 and 306 yields a PSD which is characteristic of the dominant crosstalk disturber. Using this PSD, at step 308 the service type of the crosstalk interferer can be identified and provided. Specifically, mathematical features of the PSD such as the slope (first derivative) and the degree of curvature (second derivative) can be used to separate classes of crosstalk disturbers. Higher order statistical moments and higher order derivatives can be used when necessary. Based on these features, a classification tree can be used to identify the service type. At each node of the classification tree, a feature determines which branch to traverse. Each branch represents a subset of possible service types. For example, the most common types of service types are DSL, T1, HDSL, downstream ADSL, SHDSL 2056/4168 Kbps and SHDSL 520 Kbps. Curvature and slope can be used to distinguish DSL from the subset containing the remaining service types, so the first node curvature is used to separate the subset containing DSL from the subset containing the remaining service types. Once classification is completed at step 306, the center of gravity and the aggregate power of crosstalk disturber along with the service type can be provided.

Figure 4:
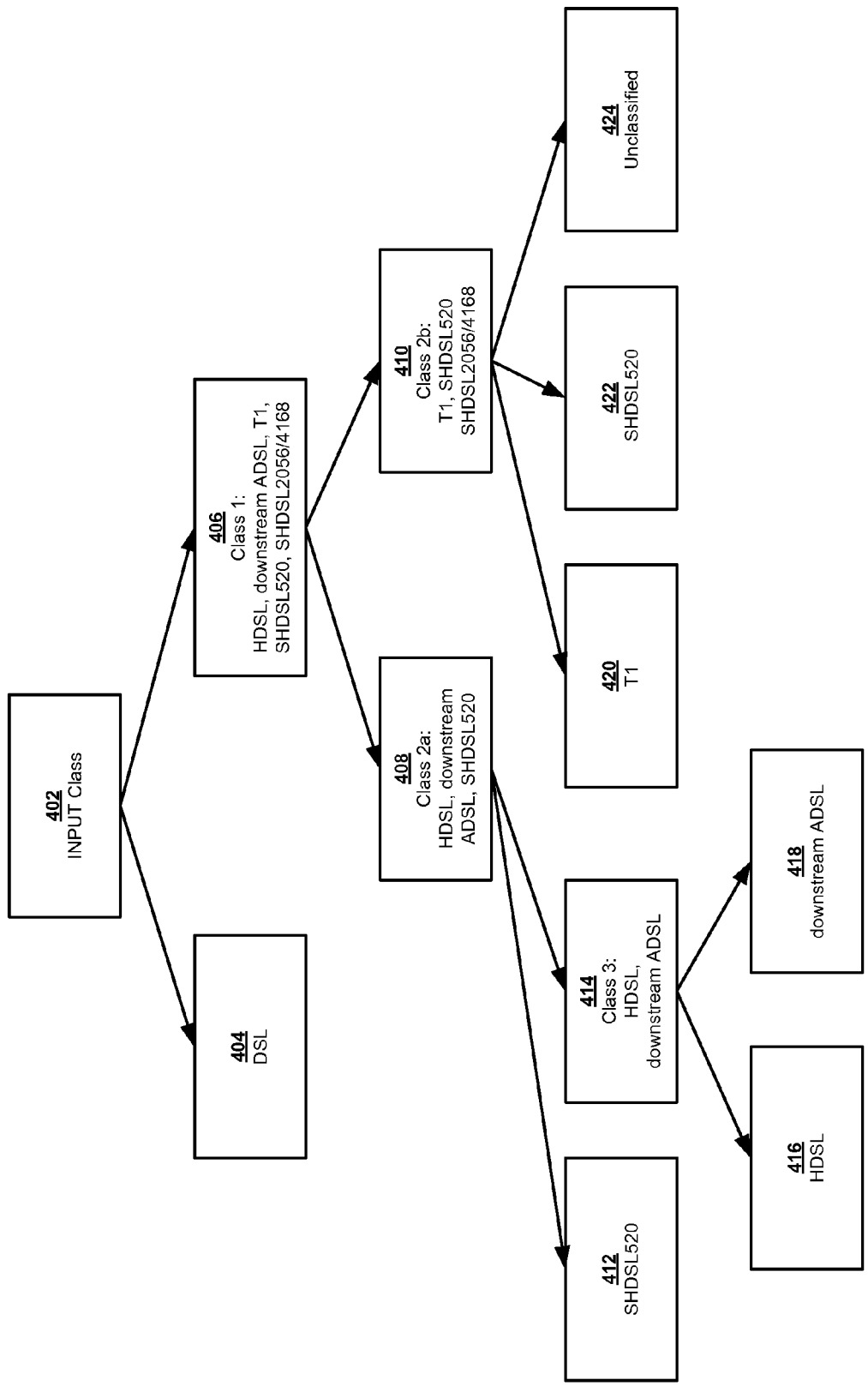
FIG. 4 shows a non-limiting exemplary classification tree used to identify upstream NEXT in an ADSL/ADSL2+ system.
Figure 5:
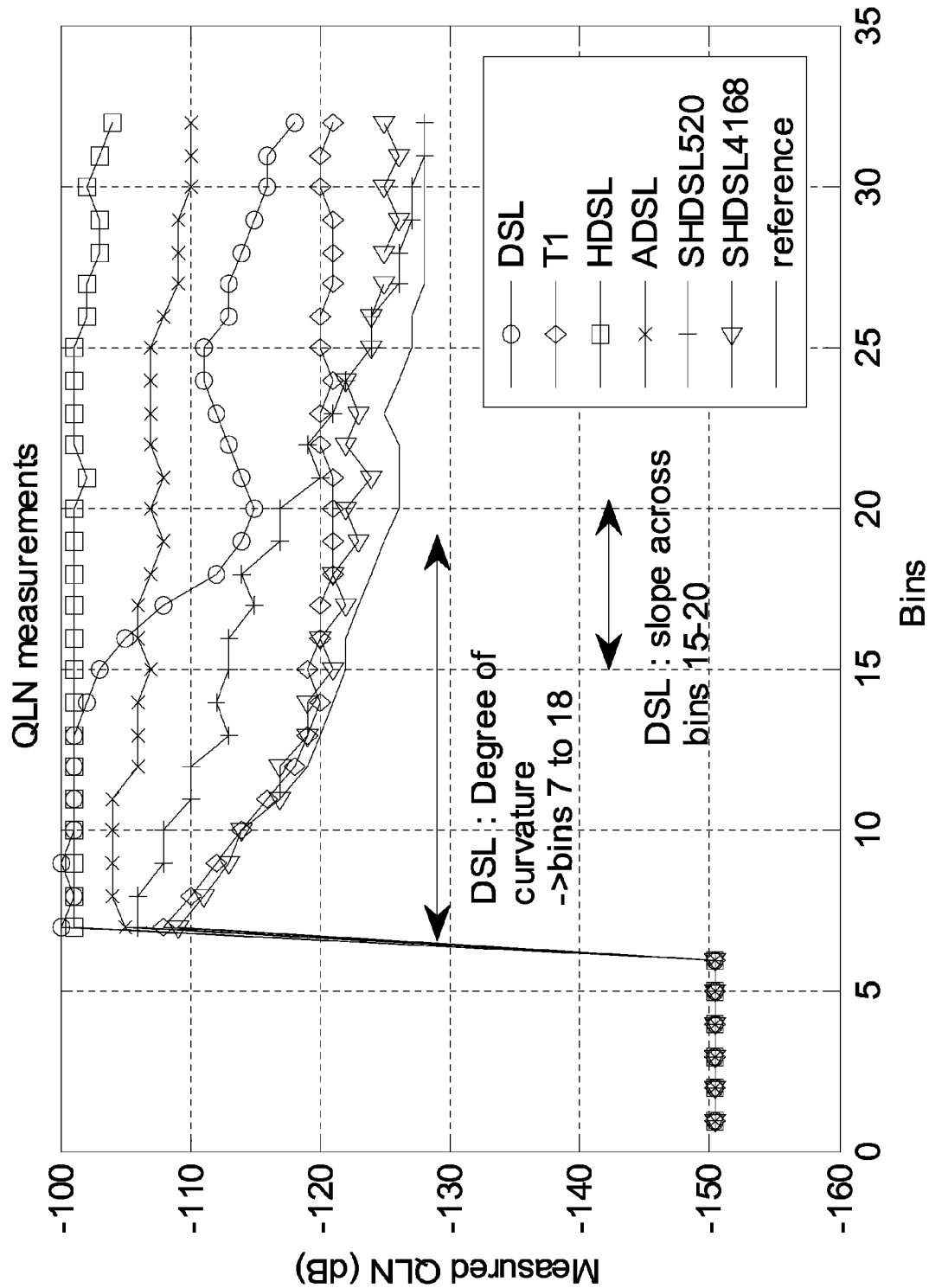
FIG. 5 is a graph illustrating the difference between the PSD of DSL compared to other disturbers.

FIG. 4 shows a non-limiting exemplary classification tree used to identify upstream NEXT in an ADSL system or equivalently an ADSL2+ system which has the same upstream bandwidth as ADSL. A PSD is accepted at node 402 with an initial input class of DSL, T1, HDSL, downstream ADSL, SHDSL 2056/4168 Kbps and SHDSL 520 Kbps. Based on the certain features described in more detail below, DSL can be separated from the class comprising T1, HDSL, downstream ADSL, SHDSL 4168 Kbps and SHDSL 520 Kbps, shown as "class 1" in the diagram. If the classification is made of DSL, the classification reaches a terminal leaf at node 404 and the classification is done. If the classification is made of class 1, the classification traverses the tree to node 406. It should be noted that there are two basic reasons that the first classification separates DSL from class 1. First are the distinctive features as seen in FIG. 5 below. Second is the fact that DSL tends to be the most significant type of crosstalk disturber.

At node 406 based on the certain features described in more detail below, class 1 can be separated into a class comprising HDSL, downstream ADSL and SHDSL520 shown as "class 2a" and a class comprising T1, SHDSL520 and SHDLS2056/4168 shown as "class 2b." It should be noted that because the classification at node 406 is inadequate to distinguish SHDSL520, SHDSL520 remains a possible service type in either class 2a or class 2b. The classification process then traverses down the classification tree to node 408 for class 2a and to node 410 for class 2b. At node 408, based on the certain features described in more detail below, SHDSL520 can be separated from the class comprising HDSL and downstream ADSL shown as "class 3." If the classification is made of SHDSL520, the classification reaches a terminal leaf at node 412 and the classification is done. If the classification is made of class 3, the classification traverses the tree to node 414. At node 414 based on the certain features described in more detail below, class 3 can be separated into HDSL and downstream ADSL represented by terminal leaves at nodes 416 and 418, respectively. The classification is complete. Returning to node 410, based on the certain features described in more detail below, T1 can be characterized, as SHDSL520 represented by terminal leaves at nodes 420 and 422, respectively. However, it may be possible that the three service types cannot be classified, so in that case the tree traverses to terminal leaf at node 424, where the crosstalk disturber could still possibly be SHDSL520, T1 or SHDSL2056/4168. Generally, a classification which falls to leaf at node 424 is indicative of a failure to be able to classify the noise. The circumstances in traversing the classification tree to reach this node could also indicate simply background noise with no crosstalk. In this example, details of the classification which takes place at nodes 402, 406, 408, 410, and 414 are given below.

The presence or lack of calibration in step 302 does not change the general methodology. However, it does change the specific threshold values used below. For example, the predetermined curvature threshold shown in FIG. 5 between bins 7 and 18 might not be −1.0, but another value.

FIG. 5 is a graph illustrating the difference between the PSD of DSL compared to other disturbers. It should be noted that the reference PSD shown in the graph is indicative of a system with no crosstalk and is representative of background noise. Details of the characteristics of this graph can be used to perform the classification at node 402 as described above. From the graph, the curvature of the DSL curve between bins 7 and 18 is distinctive as well as the slope between bins 15 and 20. For example, if the curvature is less than −1.0 and the slope is less than −1.2, classification of DSL is made.

Slope across a range of bins can be calculated as an aggregate slope where the slope taking the difference in power levels at the start and end bins of the range and dividing by the distance between them. It can be calculated as an average slope by calculating the slope at each bin and averaging them. For the sake of the examples to follow, the slope used is the average slope.

Curvature across a range of bins can be approximated by averaging the curvature at each bin, where the curvature at each bin is derived by the second derivative (second order difference). An alternative method used in the examples described here, begins by calculating the first derivative (differences) at each bin in the range. The first derivative is then smoothed out by applying a smoothing function such as a median filter (for example of order 3). Finally, the aggregate slope of the smoothed first derivative is taken as the curvature.

Figure 6:
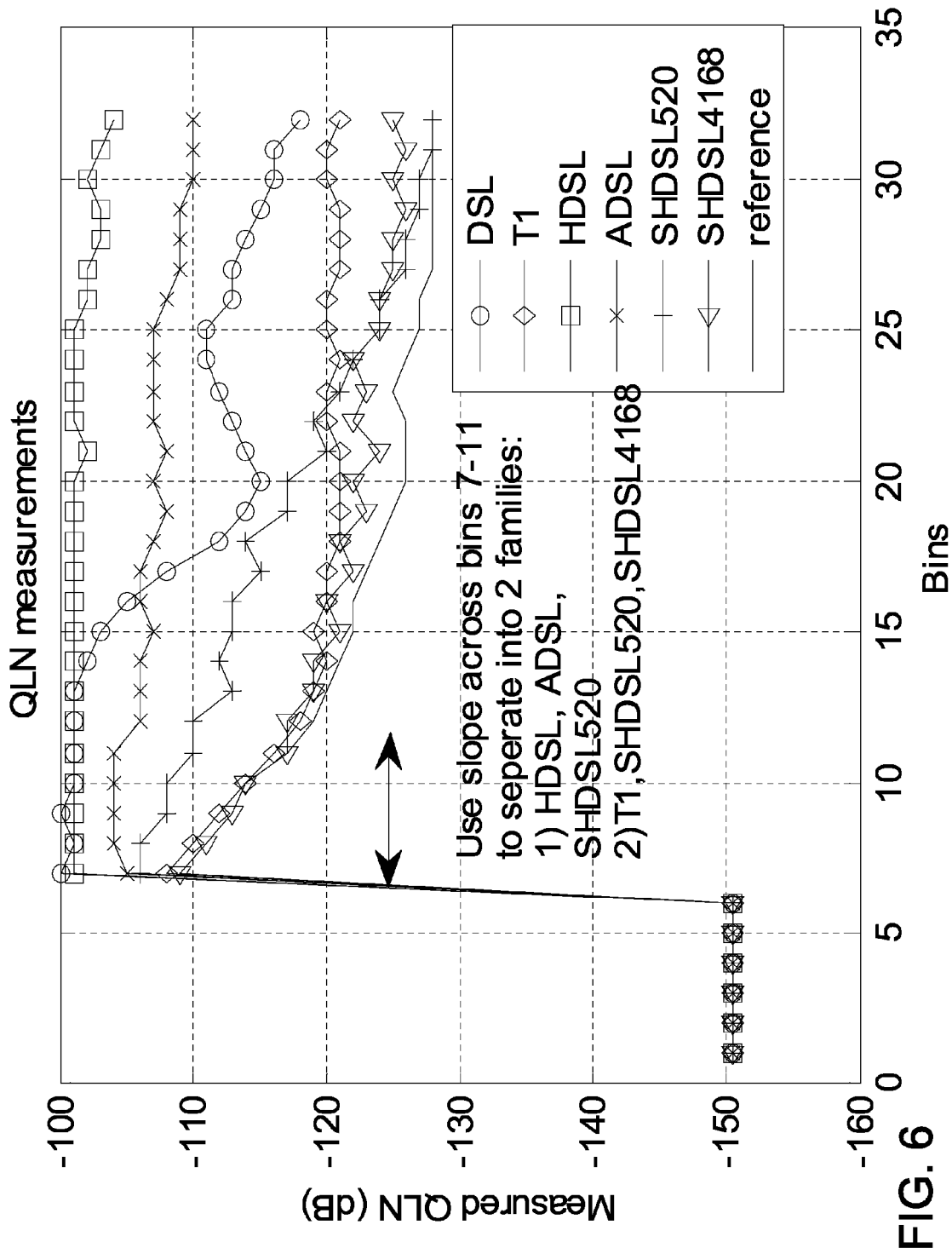
FIG. 6 is a graph illustrating the difference between the PSD of two classes of crosstalk disturbers.

FIG. 6 is a graph illustrating the difference between the PSD of class 2a and class 2b disturbers. Details of the characteristics of this graph can be used to perform the classification at node 406 as described above. From the graph, class 2a and class 2b disturbers exhibit distinctive slope between bins 7 and 11. A slope above a predetermined value such as −1.5 is indicative of class 2a, otherwise the PSD is indicative of class 2b.

Figure 7:
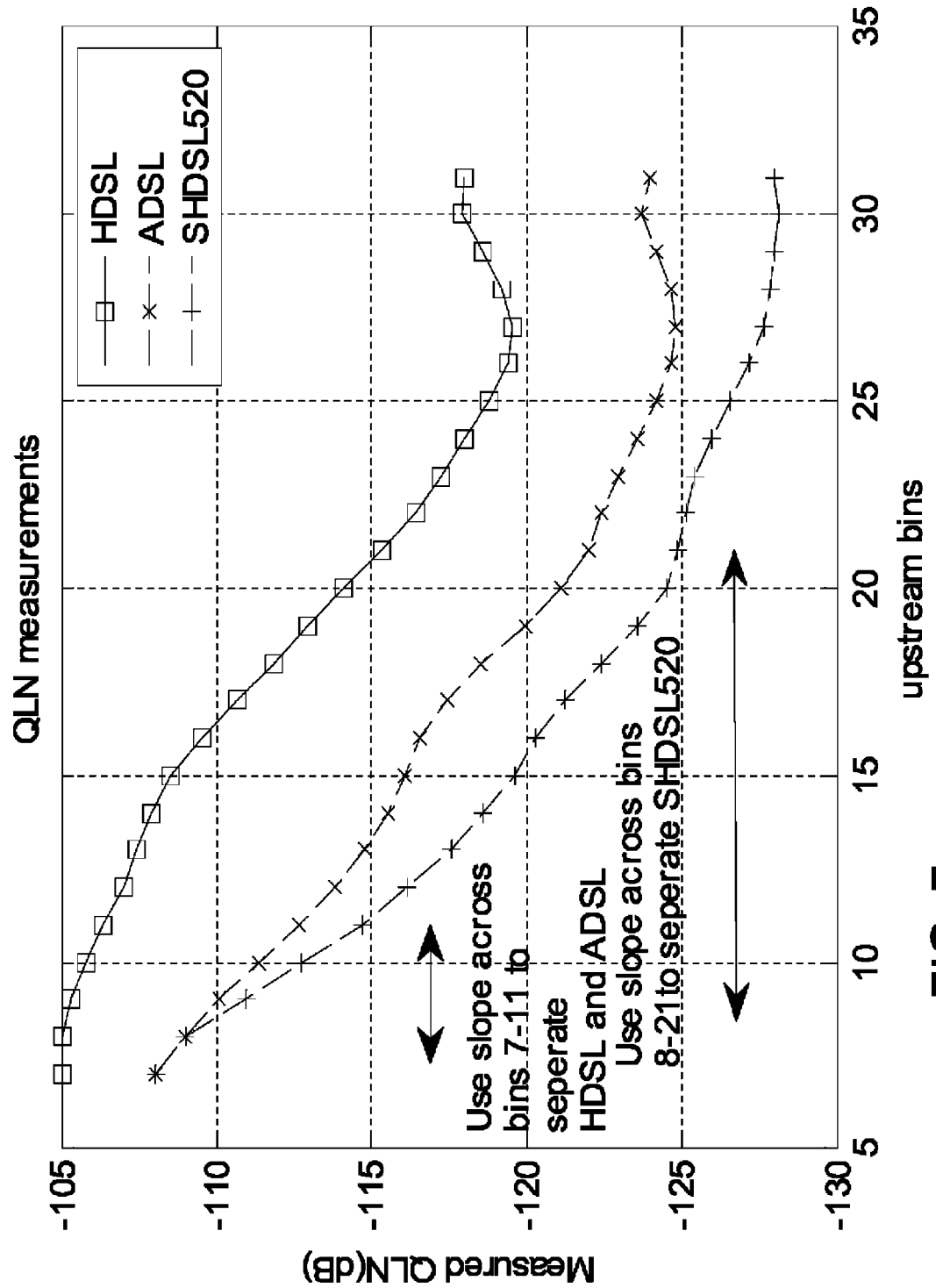
FIG. 7 is a graph illustrating the difference between the PSD of SHDSL520, downstream ADSL and HDSL.

FIG. 7 is a graph illustrating the difference between the PSD of SHDSL520, downstream ADSL and HDSL. Details of the characteristics of this graph can be used to perform the classification at nodes 408 and 414. From the graph, the slope between bins 8 and 21 can be used to separate SHDSL520 from class 3, for example, if that slope is less than −1.05. Furthermore, the slope between bins 7 and 11 can be used to separate HDSL from downstream ADSL. For example, if the slope is greater than −0.4, a classification of HDSL can be made.

Figure 8:
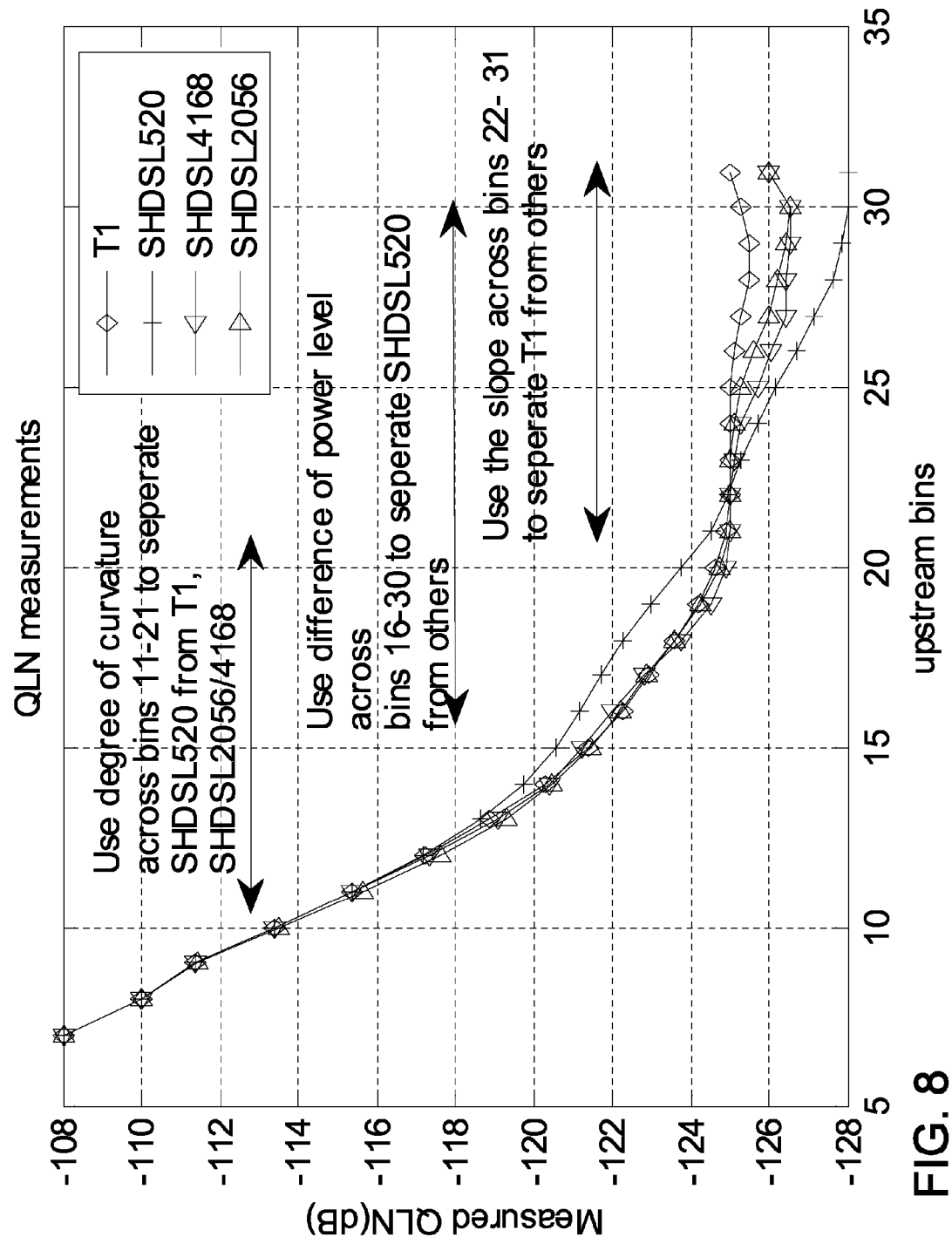
FIG. 8 is a graph illustrating the difference between the PSD of T1, SHDSL520 and SHDSL2056/4168.

FIG. 8 is a graph illustrating the difference between the PSD of T1, SHDSL520 and SHDSL2056/4168 of class 2b. Details of the characteristics of this graph can be used to perform the classification at node 410. From the graph, the curvature between bins 11 and 21 and the slope between bins 16 and 30 can be used to distinguish SHDSL520 from T1 and SHDSL2056/4168, for example, if the curvature is less than 0.755 and the slope is less than −7.2. The slope between bins 22 and 31 are can be used to further distinguish T1, for example, if the slope is greater than zero. Failing all, to match these conditions leaves only a broad classification of one of the class 2b service types.

Figure 9:
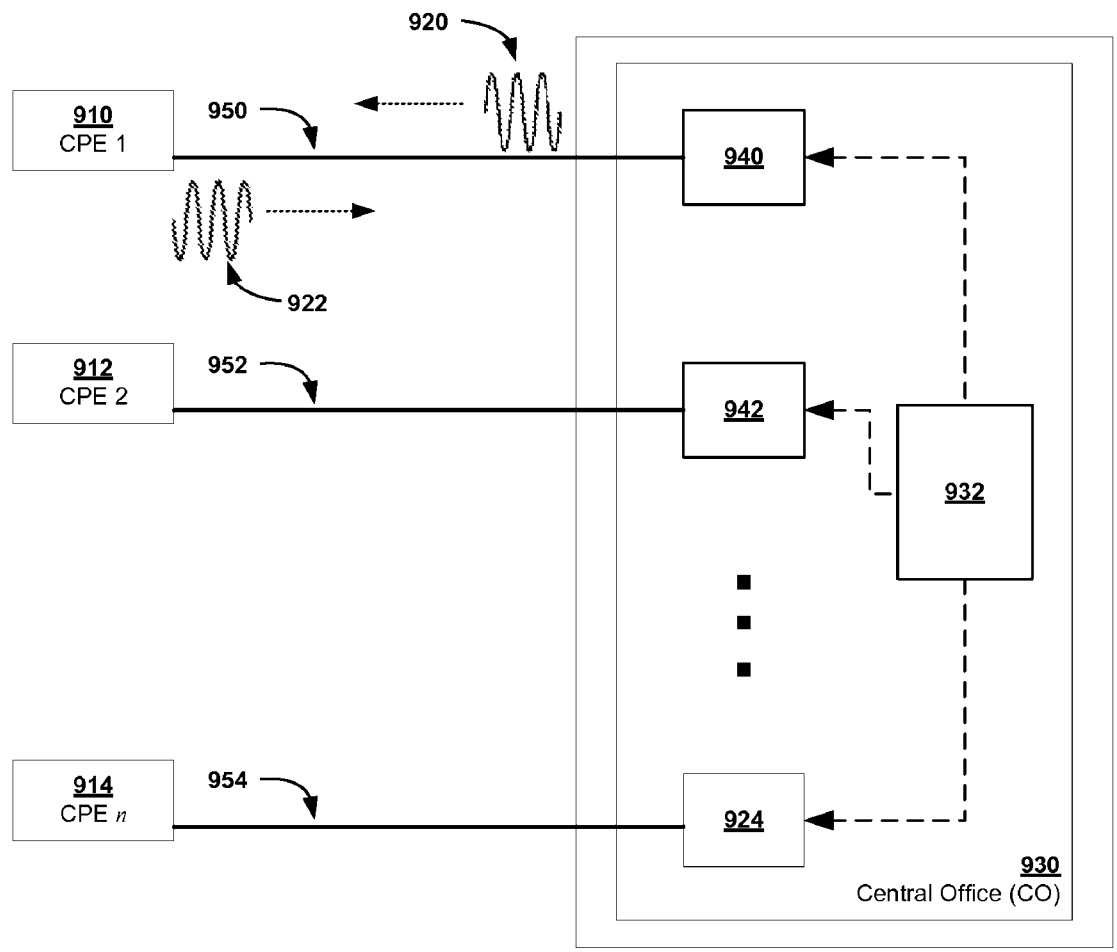
FIG. 9 which illustrates an xDSL system in which embodiments of upstream NEXT classification are applied.

FIG. 9 illustrates an xDSL system in which embodiments of upstream NEXT classification are applied. In the non-limiting example shown in FIG. 9, n CPEs are depicted (using reference numbers 910, 912, and 914). CPEs 910, 912 and 914 are connected via a loop to CO 930, where DELT module 932 for deriving QLN measurements may be implemented. Additionally, upstream NEXT classification module 934 can be implemented in CO 930 and may be part of DELT module 932. CO 930 may include an xDSL access multiplexer (DSLAM), xDSL line cards 940, 942, 944, and other equipment for interfacing with CPEs 910, 912 and 914. In some embodiments, the DELT module may be incorporated into xDSL line cards 940, 942, 944. In other embodiments, the xDSL line cards 940, 942, 944 may interface with the DELT module 932. It should be noted that while embodiments for DELT are described here in the context of central offices, it would be apparent to one of ordinary skill of the art to implement variations using SELT and/or in the context of CPEs.

Figure 10:
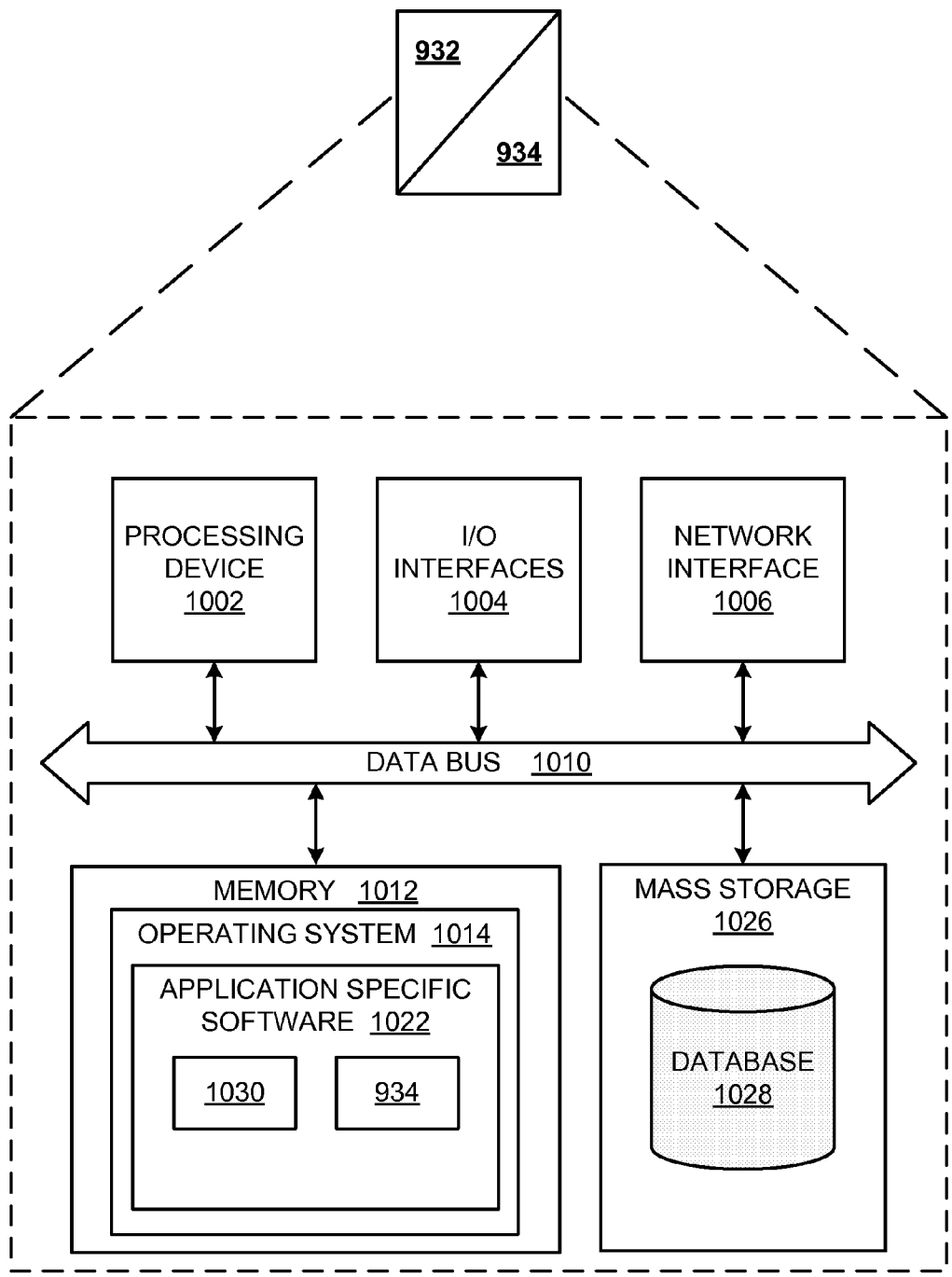
FIG. 10 illustrates an embodiment of the DELT module with upstream NEXT classification.

FIG. 10 illustrates an embodiment of the DELT module shown in FIG. 9. For simplicity sake, DELT module 932 is combined with upstream classification module 934, but could be implemented separately. Generally speaking, DELT module 932 can comprise any one of a wide variety of computing devices. Irrespective of its specific arrangement, DELT module 932 can, for instance, comprise memory 1012, a processing device 1002, a number of input/output interfaces 1004, a network interface 1006, and mass storage 1026, wherein each of these devices is connected across a data bus 1010.

Processing device 1002 can include any custom-made or commercially available processor, a central processing unit (CPU) or an auxiliary processor among several processors associated with the DELT module 932, a semiconductor-based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 1012 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 1012 typically comprises a native operating system 1014, one or more native applications, emulation systems, or emulated applications for any of a variety of operating systems and/or emulated hardware platforms, emulated operating systems, etc. For example, the applications may include application specific software 1016 such as the QLN measurement software and upstream NEXT classification module 934. One of ordinary skill in the art will appreciate that the memory 1012 can, and typically will, comprise other components which have been omitted for purposes of brevity.

Input/output interfaces 1004 provide any number of interfaces for the input and output of data. With further reference to FIG. 10, network interface device 1006 comprises various components used to transmit and/or receive data over a network environment. The DELT module 932 may further comprise mass storage 1026. For some embodiments, the mass storage 1026 may include a database 1028 to store and manage such data as metadata. Either memory 1012 or mass storage 1026 can contain the predetermined thresholds for slope and curvature used to make the classification decisions as shown in FIG. 4. For example, the values can be stored in a look-up table and can be tuned accordingly to compensate for background noise.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed:

1. A method of identifying a crosstalk disturber having a service type comprising:
   identifying narrowband disturbers using a power spectral density (PSD);
   suppressing the narrowband disturbers to generate a new PSD; and
   applying a classification tree to the new PSD to identify the service type of the crosstalk disturber.

2. The method of claim 1, wherein the suppressing comprises applying an adaptive median filter.

3. The method of claim 1, wherein the PSD is supplied by a quiet line noise (QLN) management information base (MIB).

4. The method of claim 3, wherein the QLN MIB is supplied by a dual end line testing (DELT) session.

5. The method of claim 3, wherein the QLN MIB is supplied by a single end line testing (SELT) session.

6. The method of claim 1, further comprising calibrating a QLN PSD.

7. The method of claim 6, wherein calibrating comprises receiving a null loop QLN measurement and subtracting the null loop QLN measurement from the QLN PSD in a linear scale.

8. The method of claim 1, further comprising preprocessing the PSD by applying a smooth periodogram.

9. The method of claim 1, wherein the crosstalk disturber comprises a center of gravity and aggregate power and the method further comprises calculating the center of gravity and the aggregate power.

10. The method of claim 1, wherein the classification tree comprises feature analysis to separate classes.

11. The method of claim 10, wherein the feature analysis comprises a comparison of a feature to a predetermined value.

12. The method of claim 11, wherein the features are selected from a group consisting of curvature, slope and any combination thereof.

13. The method of claim 1, wherein the classification tree separates a DSL service type from all other classes.

14. The method of claim 1,
wherein the service type is classified from a group of service types comprising DSL, T1, HDSL, downstream ADSL, SHDSL2056/4168 and SHDSL520,
wherein DSL service type are separated from a first class;
wherein the first class is further classified into a second class and a third class;
wherein the second class is further classified into SHDSL520 service type and a fourth class;
wherein the third class is further classified into T1, SHDSL520 and an undetermined class;
wherein the fourth class is further classified into HDSL service type and downstream ADSL service type; and
wherein the first class comprises T1, HDSL, downstream ADSL, SHDSL2056/4168 and SHDSL520, the second comprises HDSL, downstream ADSL, and SHDSL520, the third class comprises T1, SHDSL2056/4168 and SHDSL520 and the fourth class comprises HDSL and downstream ADSL.

15. A crosstalk classification system comprising:
a processor; and
a memory comprising instructions;
wherein the instructions causes the processor to
identify narrowband disturbers using a PSD;
suppress the narrowband disturbers to generate a new PSD; and
apply a classification tree to the new PSD to identify the service type of the crosstalk disturber.

16. The system of claim 15, wherein the instructions cause the processor to suppress the narrowband disturbers by applying an adaptive median filter.

17. The system of claim 15, wherein the PSD is supplied by a QLN MIB management information base (MIB).

18. The system of claim 15, wherein the instructions further cause the processor to calibrate a QLN PSD.

19. The system of claim 15, wherein the instructions further cause the processor to preprocess the PSD by applying a smooth periodogram.

20. The system of claim 15, wherein the classification tree comprises feature analysis to separate classes.

21. The system of claim 18, wherein the feature analysis comprises a comparison of a feature to a predetermined value.

22. The system of claim 21, wherein the features are selected from a group consisting of curvature, slope and any combination thereof.

23. The system of claim 15, wherein the classification tree separates a DSL service type from all other classes.

24. The system of claim 15,
wherein the service type is classified from a group of service types comprising DSL, T1, HDSL, downstream ADSL, SHDSL2056/4168 and SHDSL520,
wherein DSL service type are separated from a first class;
wherein the first class is further classified into a second class and a third class;
wherein the second class is further classified into SHDSL520 service type and a fourth class;
wherein the third class is further classified into T1, SHDSL520 and an undetermined class;
wherein the fourth class is further classified into HDSL service type and downstream ADSL service type; and
wherein the first class comprises T1, HDSL, downstream ADSL, SHDSL2056/4168 and SHDSL520, the second comprises HDSL, downstream ADSL, and SHDSL520, the third class comprises T1, SHDSL2056/4168 and SHDSL520 and the fourth class comprises HDSL and downstream ADSL.

25. An xDSL system comprising the crosstalk classification system of claim 15.

26. A system comprising:
a means for identifying narrowband disturbers using a power spectral density (PSD);
a means for suppressing the effect of the narrowband disturber to generate a new PSD; and a
means for applying a classification tree to the new PSD to identify the service type of the crosstalk disturber.

27. The system of claim 26, wherein the PSD is supplied by a QLN MIB.

28. The system of claim 26, further comprising a means for calibrating a QLN PSD.

29. The system of claim 26, further comprising a means for preprocessing the PSD.

* * * * *